(12) United States Patent
Mayfield

(10) Patent No.: US 12,598,269 B2
(45) Date of Patent: *Apr. 7, 2026

(54) GENERATING COMPOSITE PRESENTATION CONTENT IN VIDEO CONFERENCES

(71) Applicant: Zoom Video Communications, Inc., San Jose, CA (US)

(72) Inventor: Ross Douglas Mayfield, Palo Alto, CA (US)

(73) Assignee: Zoom Communications, Inc., San Jose, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 18/380,469

(22) Filed: Oct. 16, 2023

(65) Prior Publication Data

US 2024/0040081 A1     Feb. 1, 2024

Related U.S. Application Data

(63) Continuation of application No. 17/854,745, filed on Jun. 30, 2022, now Pat. No. 11,800,058, which is a (Continued)

(51) Int. Cl.
*H04N 7/15*         (2006.01)
*H04N 5/272*        (2006.01)

(52) U.S. Cl.
CPC .............. *H04N 7/15* (2013.01); *H04N 5/272* (2013.01)

(58) Field of Classification Search
CPC ................................. H04N 7/15; H04N 5/272
See application file for complete search history.

(56) References Cited

U.S. PATENT DOCUMENTS

| | | | |
|---|---|---|---|
| 10,681,300 B1 * | 6/2020 | Meccarelli | ............. H04N 7/152 |
| 10,986,301 B1 | 4/2021 | Schanz | |

(Continued)

OTHER PUBLICATIONS

"Live Cameras in PowerPoint (webcams, IP cameras and streaming videos)", Presentation Point, Online Available at: https://www.presentationpoint.com/blog/live-cameras-in-powerpoint/, Apr. 17, 2020, 13 pages.

(Continued)

*Primary Examiner* — Amal S Zenati
(74) *Attorney, Agent, or Firm* — Kilpatrick Townsend & Stockton LLP

(57) ABSTRACT

One example method includes joining, using a computing device, a video conference hosted by a video conference provider, the video conference having a plurality of participants; accessing, by the computing device, presentation content during the video conference, the presentation content comprising one or more content items and one or more video filters, at least one of the one or more video filters corresponding to one of the content items; receiving a selection of a first item of the one or more content items; accessing a first video filter of the one or more video filters, the first video filter corresponding to the content item; receiving a video feed from a video source; generating a composite video feed comprising the first content item and the first video feed, the composite video feed based on the video filter; and providing, via the video conference provider, the composite video feed to one or more video conference participants via the video conference.

20 Claims, 10 Drawing Sheets

Related U.S. Application Data continuation of application No. 17/246,057, filed on Apr. 30, 2021, now Pat. No. 11,412,180.

(56)                References Cited

U.S. PATENT DOCUMENTS

| | | | |
|---|---|---|---|
| 11,412,180 B1 | 8/2022 | Mayfield | |
| 2004/0230651 A1* | 11/2004 | Ivashin | ............... H04L 65/4038 |
| | | | 709/204 |
| 2010/0118202 A1 | 5/2010 | Yoshida | |
| 2013/0083151 A1 | 4/2013 | Kim et al. | |
| 2013/0314421 A1 | 11/2013 | Kim | |
| 2018/0167427 A1 | 6/2018 | Kedenburg, III | |
| 2018/0239504 A1 | 8/2018 | Huang et al. | |

OTHER PUBLICATIONS

PCT App. No. PCT/US2022/024735, "International Search Report and Written Opinion", Jul. 13, 2022, 14 pages.
EP22720239.7, "Office Action", Jul. 29, 2025, 6 pages.
PCT/US2022/024735, "International Preliminary Report on Patentability", Nov. 9, 2023, 9 pages.

* cited by examiner

Video Filter
600

Video Filter
700

Video Filter
800

Content
820a

Presenter
Video Feed
806

Display Area
802

Content Video Feed
804

Content
820a

Video Filter
810

Content Video Feed
814

Presenter
Video Feed
816

Content
820b

Display Area
812

900

1000

GENERATING COMPOSITE PRESENTATION CONTENT IN VIDEO CONFERENCES

CROSS-REFERENCE

This application is a continuation of U.S. patent application Ser. No. 17/854,745, filed Jun. 30, 2022, titled "Generating Composite Presentation Content in Video Conferences," which is a continuation of U.S. patent application Ser. No. 17/246,057, filed Apr. 30, 2021, now U.S. Pat. No. 11,412,180, titled "Generating Composite Presentation Content in Video Conferences," the entirety of both of which are hereby incorporated by reference.

FIELD

The present application generally relates to presenting content during a video conference and more specifically relates to generating composite presentation content in video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for generating composite presentation content in video conferences. One example method for generating composite presentation content in video conferences includes joining, using a computing device, a video conference hosted by a video conference provider, the video conference having a plurality of participants; accessing, by the computing device, presentation content during the video conference, the presentation content comprising one or more content items and one or more video filters, at least one of the one or more video filters corresponding to one of the content items; receiving a selection of a first item of the one or more content items; accessing a first video filter of the one or more video filters, the first video filter corresponding to the content item; receiving a video feed from a video source; generating a composite video feed comprising the first content item and the first video feed, the composite video feed based on the video filter; and providing, via the video conference provider, the composite video feed to one or more video conference participants via the video conference.

Another example method for generating composite presentation content in video conferences includes obtaining, by a computing device, presentation content comprising one or more content items; defining a first video filter, the first video filter identifying a region in a virtual screen corresponding to a live video feed; associating the first video filter with a first content item of the one or more content items to generate updated presentation content; and storing the updated presentation content, the updated presentation content comprising the one or more content items, the first video filter, and the association between the first video filter and the first content item.

An example system for generating composite presentation content in video conferences includes a non-transitory computer-readable medium; a communications interface; and one or more processors communicatively coupled to the non-transitory computer-readable medium and the communications interface, the one or more processors configured to execute processor-executable instructions stored in the non-transitory computer-readable medium to join, using the communications interface, a video conference hosted by a video conference provider, the video conference having a plurality of participants; access presentation content during the video conference, the presentation content comprising one or more content items and one or more video filters, at least one of the one or more video filters corresponding to one of the content items; receive a selection of a first content item of the one or more content items; access a first video filter of the one or more video filters, the first video filter corresponding to the first content item; receive a video feed from a video source; generate a composite video feed comprising the first content item and the first video feed, the composite video feed based on the video filter; and provide, using the communications interface and via the video conference provider, the composite video feed to one or more video conference participants via the video conference.

Another example system for generating composite presentation content in video conferences includes a non-transitory computer-readable medium; a communications interface; and one or more processors communicatively coupled to the non-transitory computer-readable medium and the communications interface, the one or more processors configured to execute processor-executable instructions stored in the non-transitory computer-readable medium to obtain presentation content comprising one or more content items; define a first video filter, the first video filter identifying a region in a virtual screen corresponding to a live video feed; associate the first video filter with a first content item of the one or more content items to generate updated presentation content; and store the updated presentation content, the updated presentation content comprising the one or more content items, the first video filter, and the association between the first video filter and the first content item.

An example non-transitory computer-readable medium comprising processor-executable instructions configured to cause one or more processors to join a video conference hosted by a video conference provider, the video conference having a plurality of participants; access presentation content during the video conference, the presentation content comprising one or more content items and one or more video filters, at least one of the one or more video filters corresponding to one of the content items; receive a selection of a first content item of the one or more content items; access a first video filter of the one or more video filters, the first video filter corresponding to the first content item; receive a video feed from a video source; generate a composite video feed comprising the first content item and the first video feed, the composite video feed based on the video filter; and provide, using the communications interface and via the video conference provider, the composite video feed to one or more video conference participants via the video conference.

Another example non-transitory computer-readable medium comprising processor-executable instructions configured to cause one or more processors to obtain presentation content comprising one or more content items; define a first video filter, the first video filter identifying a region in a virtual screen corresponding to a live video feed; associate the first video filter with a first content item of the one or more content items to generate updated presentation content; and store the updated presentation content, the updated presentation content comprising the one or more content items, the first video filter, and the association between the first video filter and the first content item.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
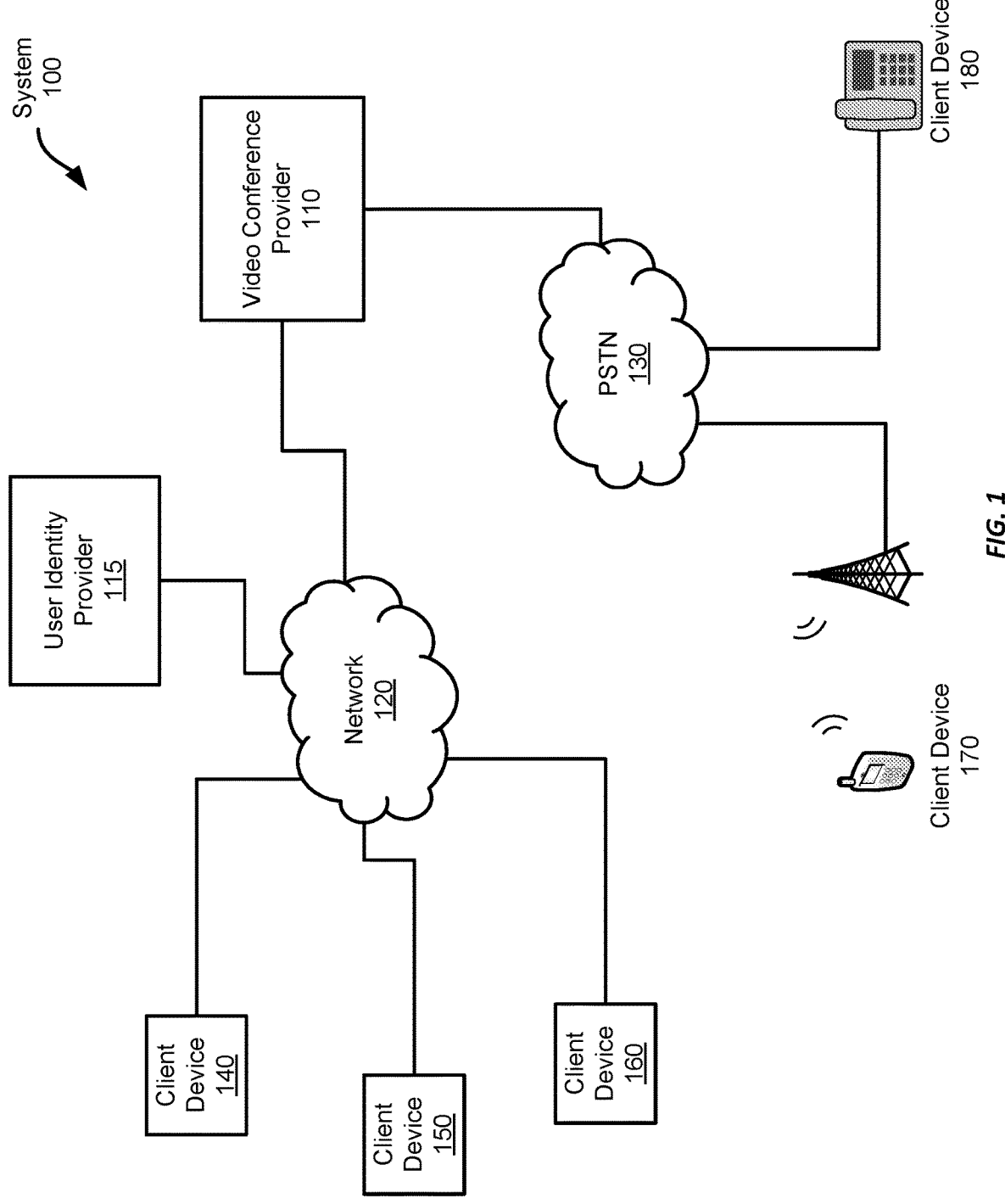
FIGS. 1-3 show example systems for generating composite presentation content in video conferences.

Examples are described herein in the context of generating composite presentation content in video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a video conference, participants may engage with each other to discuss any matters of interest. Typically such participants will interact in a video conference using a camera and microphone, which provides video and audio streams (each a "media" stream) that can be delivered to the other participants by the video conference provider and be displayed via the various client devices' displays or speakers. However, in some cases, participants may wish to discuss a document, presentation, video, or other electronic content.

To enable all participants to view the content, and without needing to distribute a copy to each participant (e.g., by email), one participant (the "presenter") may employ functionality in the video conference system to share a view of such content, such as a view of a document window on the presenter's client device. The presenter may interact with the video conference software executing on their client device to select an option to share content and to identify the content to be shared. After selecting the content, the video conference software may generate a new data stream, similar to the data streams used to provide video and audio data from the participants in the video conference, that is provided to each of the participants in the video conference. Thus, the content is depicted on the display of each participant's client device, and the participants may view relevant portions of the content.

However, when the presenter is sharing content, the other client devices may display the shared content in a prominent position, e.g., in the center of the display, while relegating video feeds from the participants, including the presenter, to smaller, less obtrusive positions on the screen. As a result, it may not be apparent which participant is presenting the content and it may be less engaging for the participants to simply look at a presentation slide without the benefit of seeing the presenter discuss the slide, as they might in a live presentation.

To enable the presenter to be seen while presentation content is displayed in the video conference, the presenter, prior to presenting the content, creates a series of presentation slides with the content to be presented. While creating the presentation slides, the presenter also creates one or more video filters that specify an on-screen arrangement of a presentation slide and a video feed from the presenter's camera. For example, the on-screen arrangement may size the presentation slide to cover the entire display area and size the presenter's video feed to cover the lower right corner of the display area. Alternatively, the on-screen arrangement may position a presentation slide in the upper left corner of the screen, while positioning the presenter's video feed in the lower right.

As the presenter creates the presentation slides and the video filters, they associate video filters with presentation slides and store those associations as a part of the presentation content. Thus, at a later time, when the presenter accesses the presentation content to present in a video conference, the presentations slides may be presented according to the corresponding video filter. And because the presentation content may have multiple different video filters associated with different slides, or in some cases with different views of the same slide, as the presenter progresses through the presentation, different video filters may be applied, causing the on-screen arrangement of the presentation slides and the presenter's own video feed to change. The use of these different video filters may allow the presenter to present different presentation slides differently, to vary the view of the presentation to maintain engagement with the other participants in the video conference, or to emphasize particular parts of the presentation in different ways from other parts.

Further, in examples where the presentation slides and the video filters are stored together in a common file or in a common package of files as the presentation content, the presentation content can easily be transported to different computing devices, depending on where the presenter may be presenting from, e.g., from a computing device in their office or a portable computing device while travelling. Such functionality may enable the presenter to easily manage the presentation and provide a consistent presentation experience, despite presenting the content at different times to different audiences.

This illustrative example is given to introduce the reader to the general subject matter discussed herein and the disclosure is not limited to this example. The following sections describe various additional non-limiting examples and examples of systems and methods for generating composite presentation content in video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
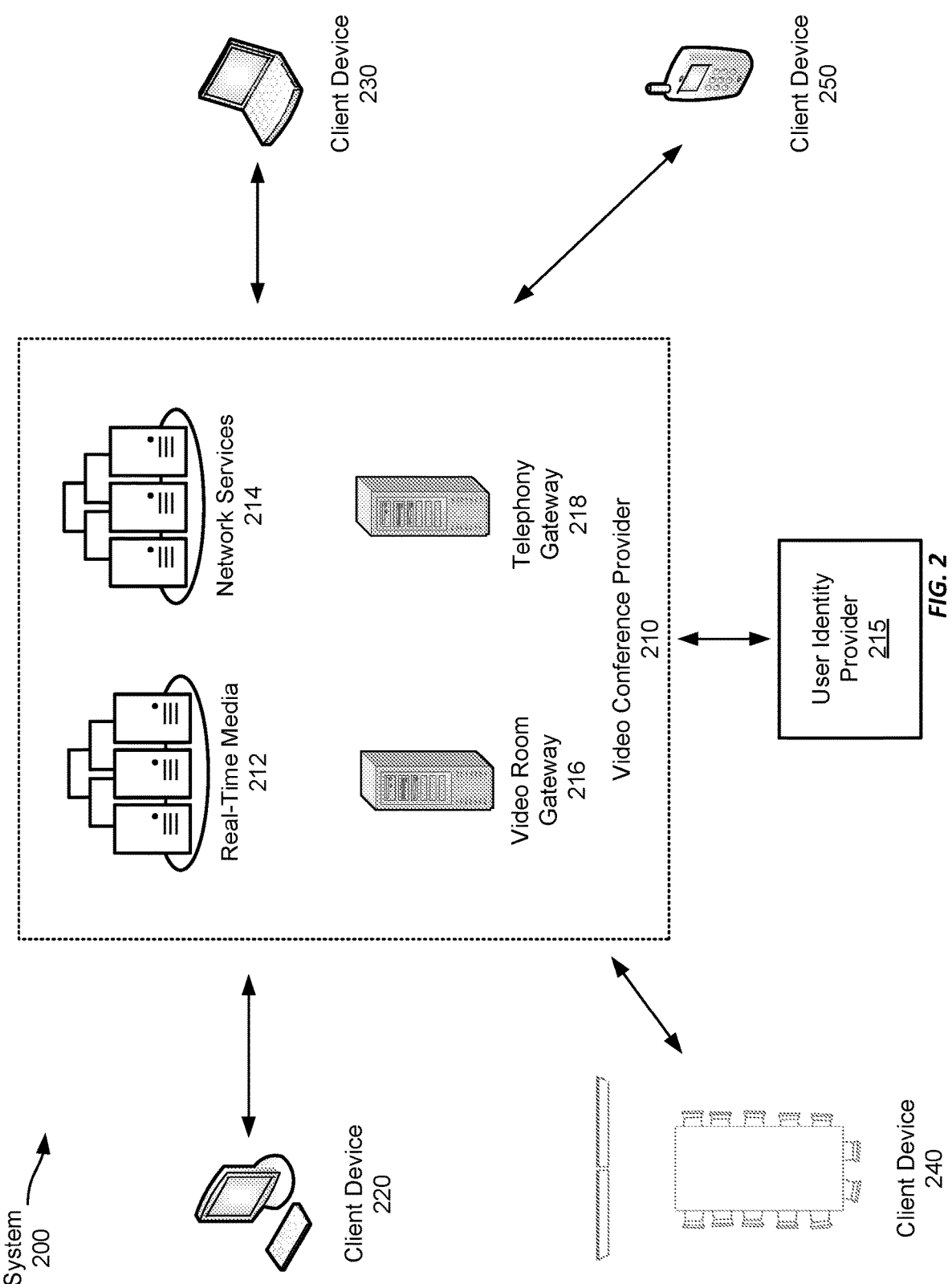

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
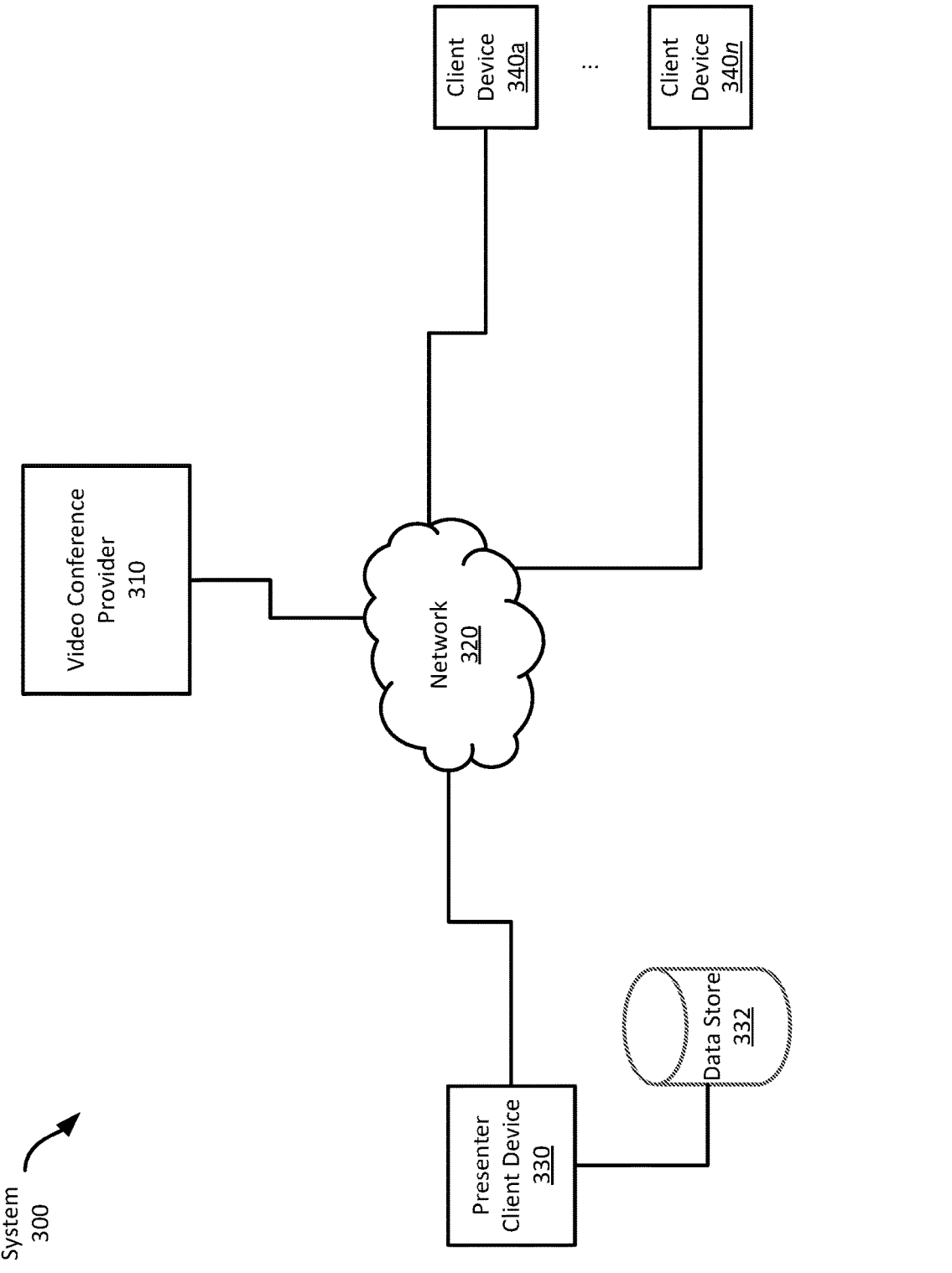

Referring now to FIG. 3, FIG. 3 shows an example system 300 for generating composite presentation content in video conferences. In this example system 300, a number of client device 330, 340a-n are connected to a video conference provider 310 via a communications network 320. In this example, the communications network 320 is the internet, however, any suitable communications network or combination of communications network may be employed, including LANs (e.g., within a corporate private LAN), WANs, etc.

Each client device 330, 340a-n executes video conference software, which connects to the video conference provider 310 and joins a meeting. During the meeting, the various participants (using video conference software at their respective client devices 330, 340a-n) are able to interact with each other to conduct the meeting, such as by viewing video feeds and hearing audio feeds from other participants, and by capturing and transmitting video and audio of themselves. However, during the meeting, a participant using client device 330 begins to present content to the participants in the video conference (the "presenter"). In this example, the presenter presents slides as a part of a presentation; however, any content may be shared by a presenter, such as documents, images, pre-recorded videos, live videos, etc.

To share the presentation content, the presenter interacts with the video conference software by selecting an option to present content within the meeting. For example, referring to FIG. 4, the presenter may interact with a graphical user interface ("GUI") 410 displayed on a display 400 of their client device. The example GUI 410 includes windows 430a-d to display video feeds from some (or all) of the other participants in the video conference as well as a speaker window 432 that shows the presenter's video feed, described in more detail below.

To present content, the presenter selects a GUI element, e.g., button 450, to activate content presentation functionality in the video conference software. Using such functionality, the presenter may then select the content to present, such as by selecting a running presentation application or a file. The video conference software then generates a video feed corresponding to the presented content, in addition to the video feed from the presenter's own camera. Depending on the content presented, the video conference software may also include additional functionality to assist the presenter with presenting the content. In this example, the presenter is presenting a slide show presentation, which causes the video conference software to display two slide controls 460*a-b* to advance forward or in reverse through the presentation slides, and an option to select a specific slide 462; though in other examples, other controls may be provided, such as page up or page down buttons (e.g., for documents), play/pause/rewind/fast-forward buttons (e.g., for video or audio), etc.

Examples according to this disclosure may require participants have permission from the meeting host to present content, or presenting content may be limited to the host alone. However, in some examples, any participant may be able to present content without requesting or otherwise obtaining permission to present.

Once the presenter has selected the option to present content 450 and has selected the content to share, such as output from an application for editing or presenting slides, the video conference software receives the presentation content, e.g., output display information from the presentation application or by directly accessing a file with the presentation content, and generates a presentation video feed that includes the content. In this example, the presenter is presenting a series of presentation slides and thus, when the presenter selects a slide to present, that slide (or an image of that slide) is provided to the video conference software, which uses it to generate the corresponding presentation video feed. Each of the participants can then access that new video feed and view the presentation content from the presenter.

Figure 4:
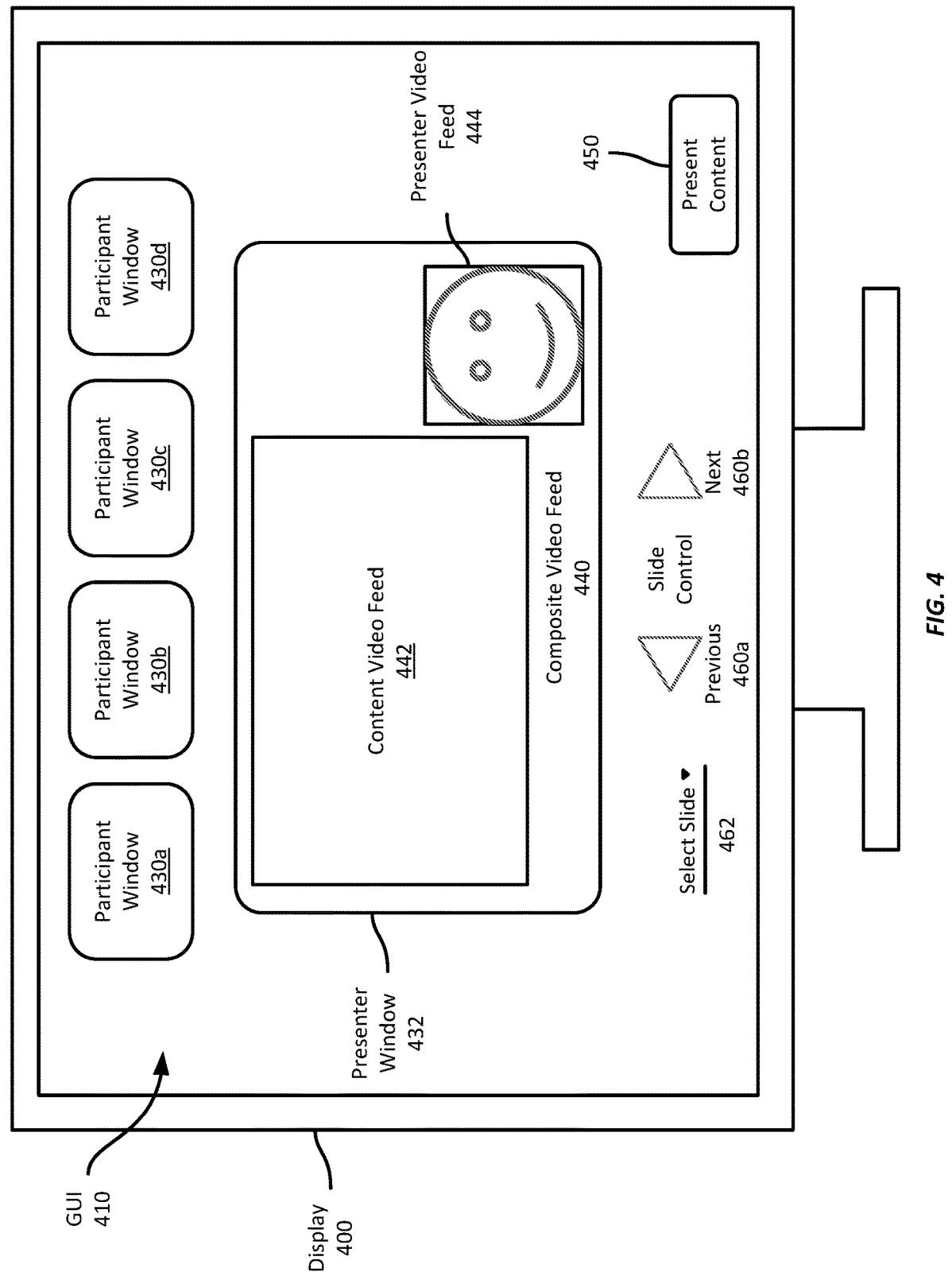
FIG. 4 shows an example graphical user interface for generating composite presentation content in a video conference.

In this example, the presentation content includes both the content to be presented, e.g., the slides in this example, as well as one or more video filters that correspond with different portions of the presentation content. The video filters define the display arrangement for the presentation content and for the video feed 444 of the presenter themself. Thus, when the presenter selects a portion of the presentation content to share, e.g., a slide, a document, a portion of a slide or document, etc., a corresponding video filter is identified that corresponds to the presentation content (or portion of the presentation content) and is applied to generate a composite video feed 440 that includes the presentation content video feed 442 and the presenter's own video feed 444. In addition, the video filter defines the arrangement between the presentation content video feed 442 and the presenter's own video feed 444. FIG. 4 illustrates one such arrangement, in which the presentation content video feed 442 is positioned to the left and slightly above the presenter video feed 444. The composite video feed is then generated by combining the presentation content video 442 and the presenter video 444 according to the video filter. The composite video feed 440 is then transmitted to the video conference provider 310, which distributes the composite video feed 440 to the participants in the video conference.

Figure 5:
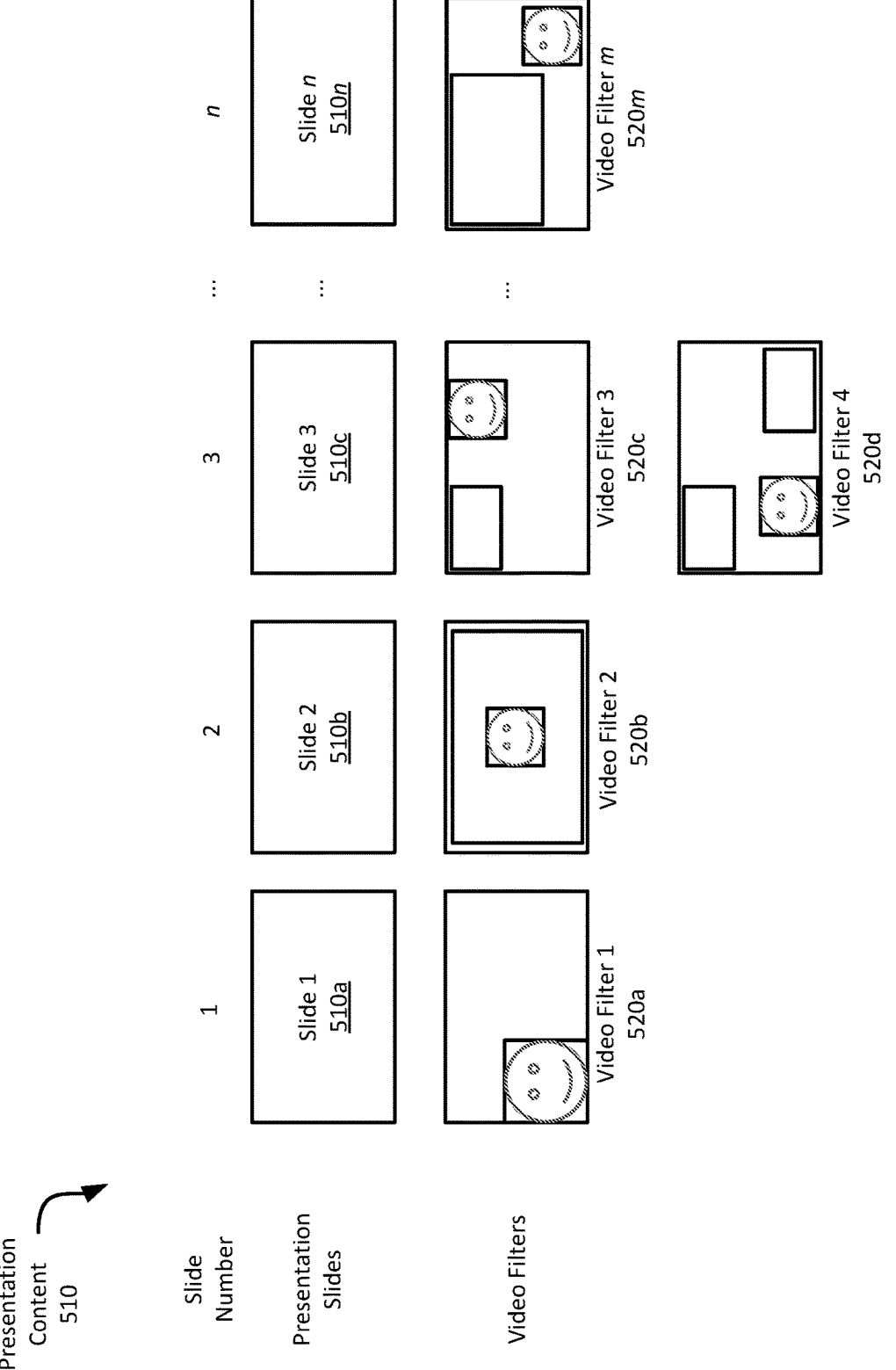
FIG. 5 shows an example presentation suitable for generating composite presentation content in a video conference.

As the presenter progresses through the content, different video filters may be applied. Referring now to FIG. 5, FIG. 5 shows an example of presentation content 500 that includes presentation slides 510*a-n* and associated video filters 520*a-m*. As illustrated in FIG. 5, each presentation slide 510*a-n* has a corresponding video filter or multiple video filters 510*a-m*. Each video filter 520*a-m* defines the arrangement of a presentation video feed and a presenter video feed, which may include a size and location of the respective video feeds, within a display area. For example, video filter 1 (520*a*) defines an arrangement where the corresponding slide consumes the entirety of the available space within the display area. It also defines the location and size for the presenter's video feed within the display area. Because video filter 1 (520*a*) provides the entire display area to the presentation content, the presenter's video feed will overlay part of the presentation content. A similar arrangement is shown in video filter 2 (520*b*) in which the presentation content occupies a region slightly smaller than the full display area, but is overlaid by the presenter's video feed. Further, video filters 3 and 4 (520*c-d*) define locations for the presenter's video feed depending on which portion of slide 3 (510*c*) is displayed, and is described in more detail below. In both cases, however, the entirety of the display area is consumed by the content's video feed, with the small boxes illustrating content within the slide.

Figure 6:
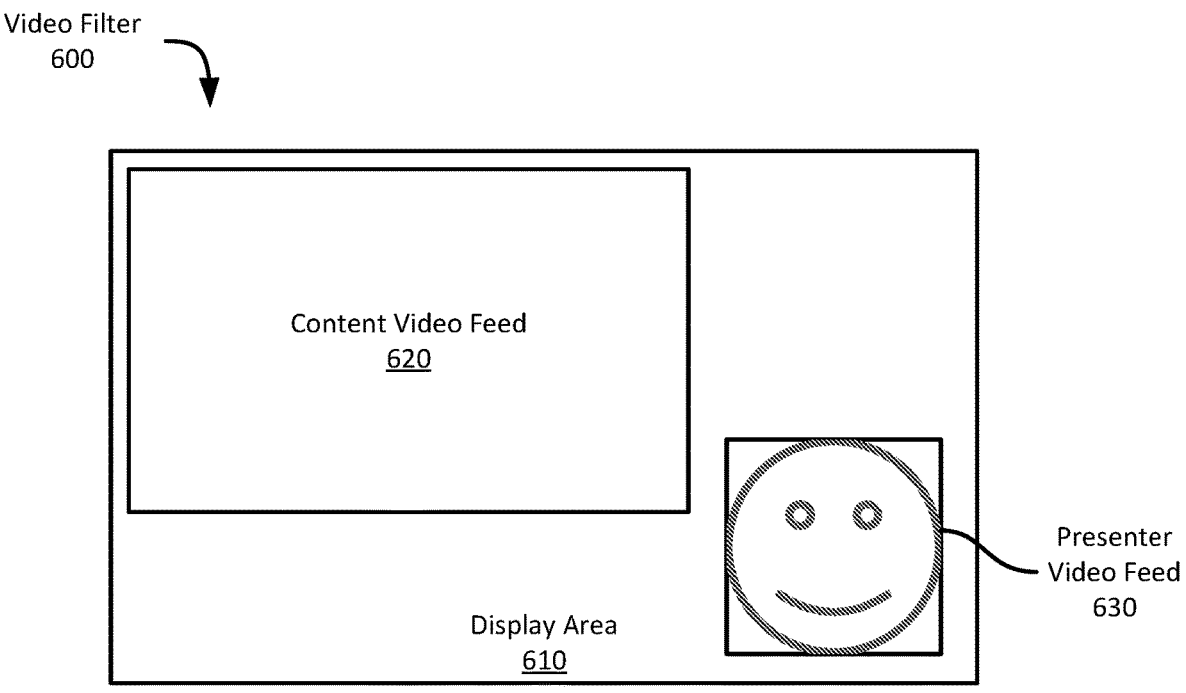
FIGS. 6, 7, 8A, and 8B shows example video filters for generating composite presentation content in video conferences.

Referring to FIG. 6, FIG. 6 shows a more detailed view of an example video filter 600. The video filter 600 defines sizes and locations for a content video feed 620 and a presenter video feed 630 within a display area 610. The size of the display area 610 corresponds to the amount of a viewer's screen that will be occupied and may not be a fixed size, e.g., 640×480 pixels. Instead, in some examples the display area 600 may be defined according to an aspect ratio, e.g., 4:3, or other normalized coordinate system that can be scaled based an actual number of pixels in width and height available or allocated to the display area 610 when the content is displayed. As illustrated in FIG. 4, the composite video feed 440 occupies a portion of the GUI 410, but the size and arrangement of the GUI may vary from client device to client device, e.g., based on physical limits of the corresponding display or based on user preferences. Because of such potential for variance across different participants, the video filter 610 may, in some examples, only use such relative sizing described above; however, fixed-sized display areas may be used in some examples.

Within the defined display area 610, the video filter 600 defines sub-regions corresponding to different video feeds 620-630, which may emanate from different sources, such as cameras or applications, e.g., a presentation application. In this example, the video filter 600 defines two sub-regions, content video feed 620 sub-region and presenter video feed 630 sub-region, though some video filters may define more than two sub-regions corresponding to more than two video feeds using similar principles to those discussed herein.

Each sub-region is defined with a size relative to a size of the display area 410 as well as a location within the display area 610, e.g., defined by the location for an upper left corner for each sub-region. Thus, as can be seen in FIG. 6, the video filter defines a content video feed 620 in the upper left portion of the display area 610 and a presenter video feed 630 in the lower right portion of the display area, each with a respective size relative to the size of the display area 610. And while this example employs sub-regions with sizes relative to the size of the display area 410, in some examples, sub-regions may be defined using fixed sizes, e.g., 320×200 pixels.

It can be seen in FIG. 6 that, due to the size and arrangement of the two sub-regions (content video feed 620 and presenter video feed 630), a portion of the display area 610 does not have an associated video feed. In some examples these portions of the display area may be set to a default color (e.g., black), while in some examples, the unallocated portions of the display area may be set to a static graphic (e.g., a logo) or may be transparent (e.g., via an alpha channel) such that any background graphics are visible within the display area 610 in the unallocated regions.

In addition to defining the sizing and arrangement of the sub-regions, the video filter also designates the source for content in each sub-region. In this example, the video filter 620 is defined as a part of presentation content, and thus the video filter 600 specifies the output of a presentation application as corresponding to the content video feed 620 sub-region. The video filter 600 also specifies a relation between the presenter video feed 630 sub-region and a video camera output. Thus, when the presenter accesses their presentation content via the video conference software, the presentation content can provide the video filter to the video conference software, which can establish the specified sub-regions and associate them with the corresponding input video streams, whether from the presentation application or the presenter's camera.

It should be appreciated that FIG. 6 illustrates one example arrangement of sub-regions within a video filter. Numerous other variations are contemplated according to this disclosure, including the example arrangements illustrated in FIG. 5.

Figure 7:
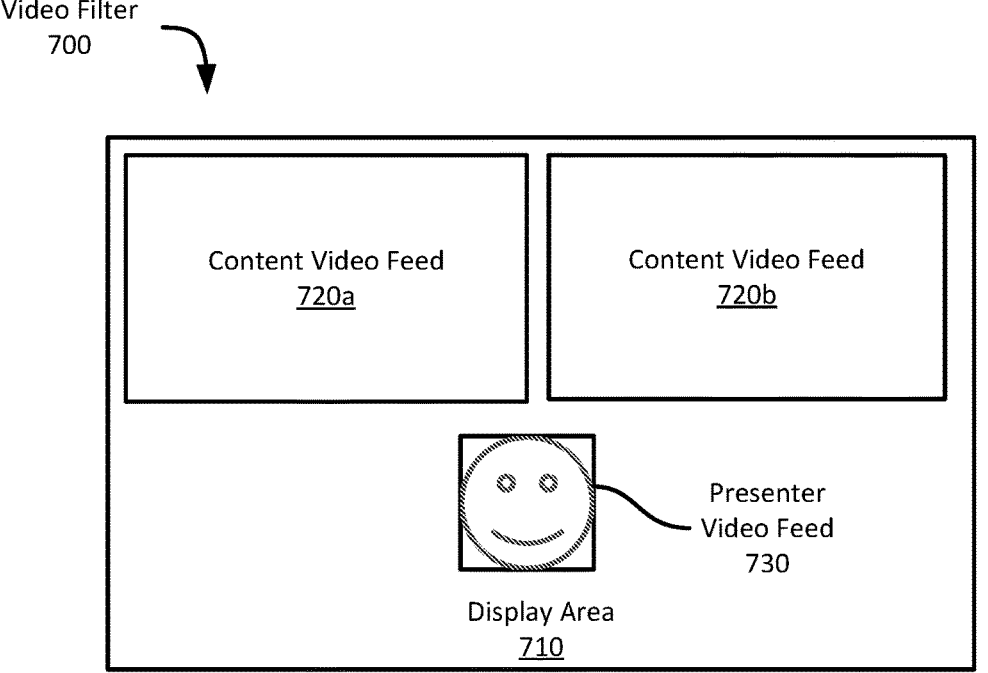

Referring now to FIG. 7, FIG. 7 illustrates an example video filter 700, similar to video filter 600 shown in FIG. 6. In this example, however, the video filter specifies three different sub-regions: content video feed 720*a* sub-region, content video feed 720*b* sub-region, and presenter video feed 730 sub-region. Thus, the video filter 700 allows the presenter to associate two different content video feeds 720*a-b*, such as from two different applications, with the video filter 700. For example, the presenter may generate a slideshow presentation that has a slide associated with the video filter 700. When the slide is reached, the video filter 700 is used and a second application, such as a video player application, can be used by the presenter to play a video clip, which will be shown in the content video feed 720*b* sub-region, while the presentation content remains visible in the content video feed 720*a* sub-region. In another use case, the presenter may present a view of source code or a design specification in one content video feed 720*a* sub-region and a view of the corresponding software application in the other content video feed 720*b* sub-region, which may enable the presenter to show and explain portions of the source code or design specification simultaneously with a demonstration of the software application incorporating such features.

The example video filter 700 shown in FIG. 7 includes three sub-regions, however, as mentioned above, any suitable number of sub-regions may be employed according to different examples.

Figure 8A:
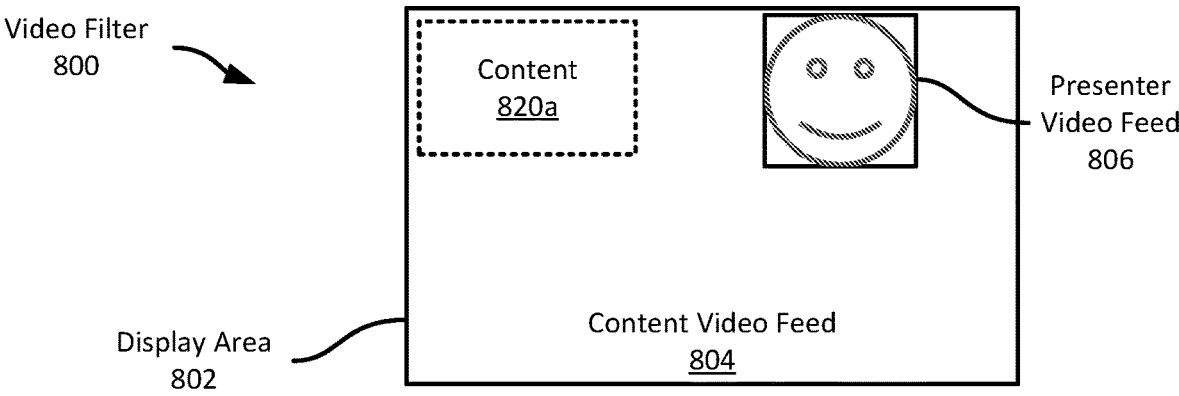
Figure 8B:
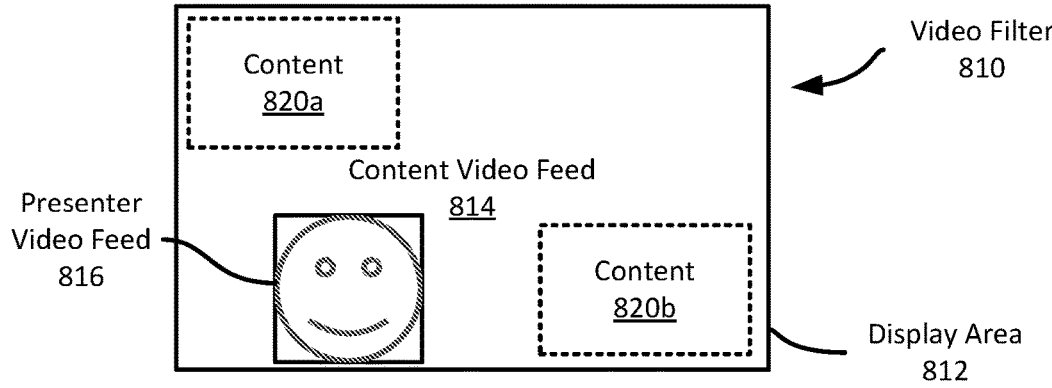

Referring now to FIGS. 8A-8B, FIG. 8A illustrates an example video filter 800, similar to video filter 3 (520*c*) in FIG. 5, that includes two sub-regions within a display area 802: content video feed 804 and presenter video feed 806. In this example, the content video feed 804 sub-region is defined as being co-extensive with the display area 802. FIG. 8A also illustrates a content 820*a* area, which is not a separately defined region in the video filter 800, but rather represents where a particular portion of the content will be displayed in the content video feed 804, when it is displayed. Thus, FIG. 8A shows that the presenter's video feed 806 has been sized and positioned by the author to correspond a portion of the content 820*a* that will be displayed in the content video feed, e.g., a portion of a presentation slide. As will be seen in FIG. 8B, when a different part of the presentation slide is revealed, the presenter video feed 806 will be relocated to be adjacent to the newly revealed portion of the presentation slide.

FIG. 8B illustrates another video filter 810, similar to video filter 4 (520*d*) in FIG. 5, that corresponds to the same presentation slide, but is applied when a particular part of the presentation slide has been revealed. Thus, it also defines two sub-regions in a display area 812, one corresponding to the content video feed 814 an the other corresponding to the presenter video feed 816. In this example, the video filter 810 specifies a different location for the presenter video feed 816 sub-region, while retaining the content video feed 814 sub-region as being co-extensive with the display area 812. In this example, the author has created a second video filter corresponding to the same presentation slide as the video filter 800 shown in FIG. 8A to adjust the location of the presenter video feed 816 sub-region so that it aligns with newly revealed presentation content.

Thus, a content author that defines video filters 800 and 810 can associate them with the same presentation content and define a transition at which time the video conference software should transition from one to the other, such as based on a control input from the presenter to reveal a part of the presentation content contained on the slide. Such techniques may allow a presenter to employ multiple different video filters corresponding to different portions of a common piece of presentation content. And while this example employs two video filters 800, 810, other examples may employ any number of video filters, according to the author's needs.

Figure 9:
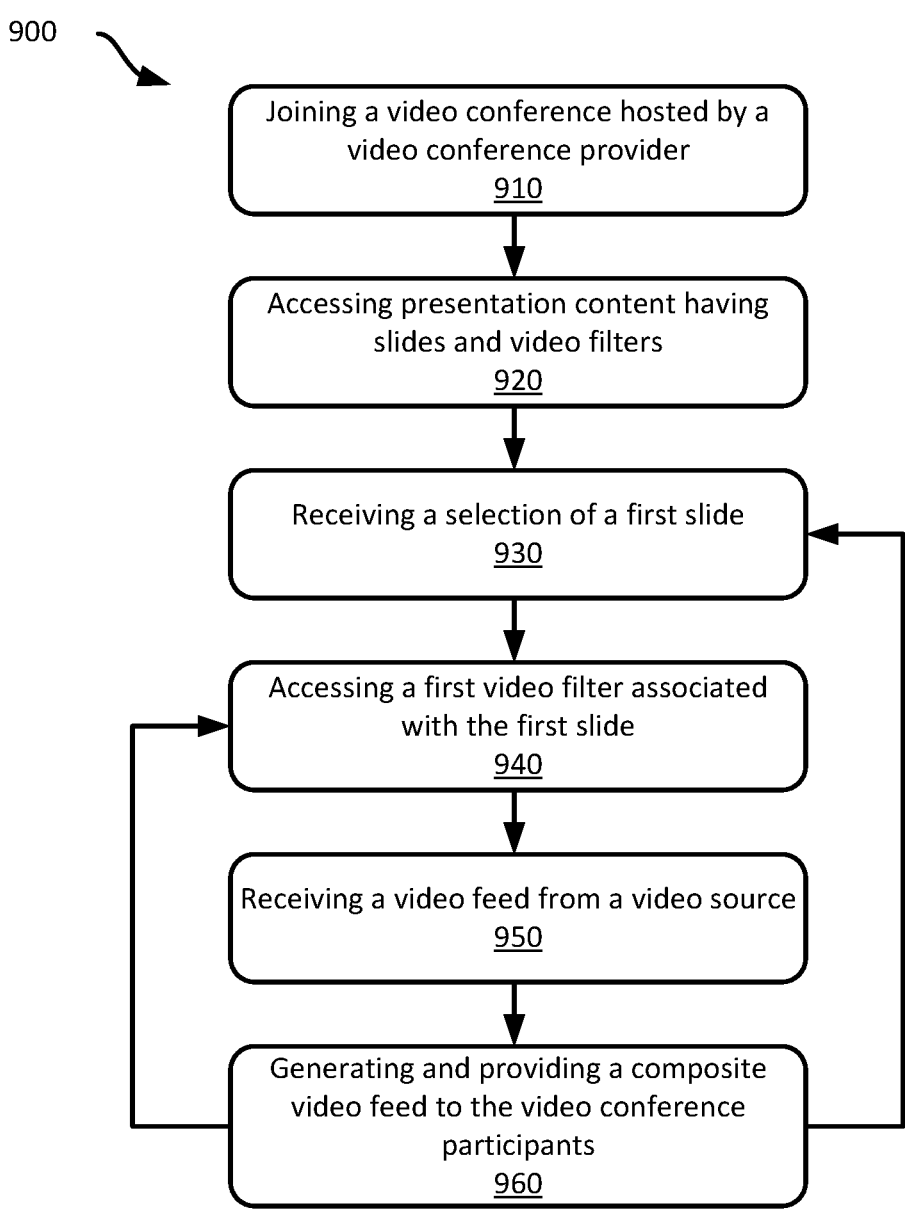
FIGS. 9-10 show example methods for generating composite presentation content in video conferences.

Referring now to FIG. 9, FIG. 9 shows an example method 900 for generating composite presentation content in video conferences. This example method 900 will be discussed with respect to FIGS. 3-5, but methods according to this disclosure may be performed using any suitable systems according to this disclosure.

At block 910, a client device 330, using video conference software, joins a video conference hosted by a video conference provider 310. In this example, the client device 330, operated by a user (referred to as the "presenter" in this example) employs a video conference application provided by the video conference provider 310 to join the video conference; however, in some examples, the client device 330 may access the video conference using a web browser or other application. It should be appreciated that multiple other participants, e.g. users of client devices 340*a-n*, may join the video conference as well, such as by using the same application as the presenter.

At block 920, the client device 330 accesses presentation content during the video conference. In this example, the presentation content includes one or more presentation slides and one or more video filters, with at least one of the one or more video filters corresponding to one of the presentation slides. As discussed above with respect to FIG. 5, presentation content may include presentation slides that the presenter may present to various participants in the video conference. The presentation slides may include various types of content within them, including text, images, video clips, etc. And while this example employs presentation slides, it should be appreciated that the presentation content may instead include any kind of content item(s), such as a document (having one or more pages), or other output from another application, such as a word processing application, a spreadsheet application, a video player, a video game, etc.

To access the presentation content, the presenter may open a file containing content, e.g., presentation slides, and one or more video filters within the video conference client. Alternatively, the presenter may open the file with another application, such as the application used to create the presentation content. The presenter may then use the video conference client to share the output of the application, such as by allowing the presenter to select an application to share within the video conference client.

As mentioned above, the presentation content also includes one or more video filters. As discussed above with respect to FIGS. 5-8B, video filters may specify an arrangement of video feeds corresponding to the presentation slides (or other content, e.g., a multi-page document or other data stored in a file or output by an application) and one or more other video feeds, such as a video feed from the presenter's camera or output from another application executing on the client device 330.

In this example, the video filters are incorporated into the same file or document as the presentation slides; however, in some examples, video filters may be stored separately from the presentation slides (or other content item), such as in a separate file or in a database. In some examples, video filters may be provided by the video conference software and may be associated with the presentation content based on one or more metadata tags stored within the presentation slides (or other content item) that reference one or more predefined video filters available from the video conference software or at the video conference provider. Some examples may employ any combination of such techniques to associate video filters with presentation slides or other content), such as by combining any or all of the following: video filters stored with the content, video filters stored separately from the content, video filters made available by the video conference software or video conference provider 310, metadata tags referencing video filters, etc.

At block 930, the client device 330 receives a selection of a first presentation slide. For example, the presenter may interact with a GUI 400 that includes controls to allow the user to select slides 462 or advance or reverse 460a-b through the slides in a presentation. If the presenter has just opened the presentation using a presentation application, the first slide may be selected automatically by the presentation application. Alternatively, the presentation may be opened directly by the video conference software, which may select the first presentation slide.

At block 940, the client device 330 accesses a first video filter corresponding to the first presentation slide. In this example, the presentation content includes video filters stored with the presentation slides as well the associations between the slides and video filters. Thus, the client device 330 is able to identify the associated video filter based on the association stored in the presentation content. For other types of associations, the client device 330 may access a file (or files) having one or more video filters as well as separately stored associations that identify slides in the presentation and corresponding video filters. In some examples, the client device may access metadata tags stored within the slides (or other content item) to identify associated video filters. Such metadata tags may include uniform resource identifiers ("URI"), such as a uniform resource locator ("URL"), to identify one or more video filters stored at the client device or on another computing device, such as one operated by the video conference provider 310. In some examples, such associations may be stored separately, such as in an XML or similar file, with identifications of video filters and corresponding slides (or other content items, such as pages, video clips, etc.).

At block 950, the client device 330 receives a video feed from a video source. In this example, the client device 330 receives a video feed from a video camera connected to (or integrated into) the client device 330, such as a webcam. As the presenter interacts with the video conference software executed by their client device 330, the video conference software accesses the video camera and receives video frames.

At block 960, the client device 330 generates a composite video feed that includes the first presentation slide (selected at block 930) and the video feed (received at block 950) based on the video filter. As discussed above, video filters can define the display arrangement for the presentation content and for the video feed, such as described above with respect to FIGS. 5-8B. Thus, the client device 330, via the video conference software in this example, can generate a composite video feed that scales the presentation slide to fit within the content video feed sub-region of a display area. Similarly, the client device 330, via the video conference software, employs the video filter to scale the video feed from the video camera to fit within the presenter video feed sub-region defined by the video filter. For example, based on the defined sizes of the sub-regions and the resolution of the source content item, e.g., a presentation slide or a video feed, the video conference software can linearly scale the content item into the associated sub-region.

After scaling the presentation slide and the video feed (or simultaneously with the scaling), the client device 330 via the video conference software generates a composite video feed having video frames that each include the scaled content positioned within video frame according to the video filter. The composite video feed is then provided to the other participants 340a-n in the video conference via the video conference provider 310.

After block 960 is completed, the method may return to block 930 when a new slide is selected.

In some examples, however, such as discussed above with respect to FIGS. 8A-8B, one presentation slide (or other content item) may have multiple video filters associated with it. Thus, the presenter may select to advance to different portion of the presentation slide, with which a different video filter is associated. Thus, the method 900 may return to block 940 to select another video filter associated with the same slide (or other content item).

While the example above was described with respect to the client device 330 performing the blocks of the method 900, in some examples, the video conference provider 310 may perform some or all of the blocks.

For example, the client device 330 may join the video conference, access presentation content, and select a first slide, generally as discussed above with respect to blocks 910-930. At block 940, the client device 330 may access a first video filter generally as described above, but may then either provide the video filter to the video conference provider 310 or it may provide information to the video conference provider 310 to enable it to access the video filter, such as by providing a URI for the video filter.

At block 950, the client device 330 may receive the video feed from the video camera as discussed above. However, at block 960, the client device 330 may provide the camera's video feed and the slide to the video conference provider 310, and the video conference provider 310 may generate and provide a composite video feed to the participant's client devices 340a-n. For example, the client device 330 may transmit one video feed to the video conference provider that includes the video feed from the video camera. It may also provide a second video feed that provides the visual output from a presentation application that is presenting the selected slide.

In some examples, rather than the client device 330 generating the composite video feed, the client device 330 provides the video filter to the video conference provider and provides two separate video feeds to the video conference provider: one including presentation slide and one including the video feed from the video camera. Upon receiving the video filter and the two video feeds, the video conference provider 310 can then generate the composite video feed based on the video filter generally as discussed above. Alternatively, the video filter may be provided to the participants' client devices 340a-n as well as the two video feeds, and the participants' clients devices 340a-n may generate the composite video feed based on the received video feeds and the video filter.

While the examples discussed above were with respect to using presentation content and a video feed, any number of video feeds may be employed to generate a composite video feed using a corresponding video filter. An example with three such feeds is discussed above with respect to FIG. 7, but the present disclosure is not limited to two or three video feeds.

Figure 10:
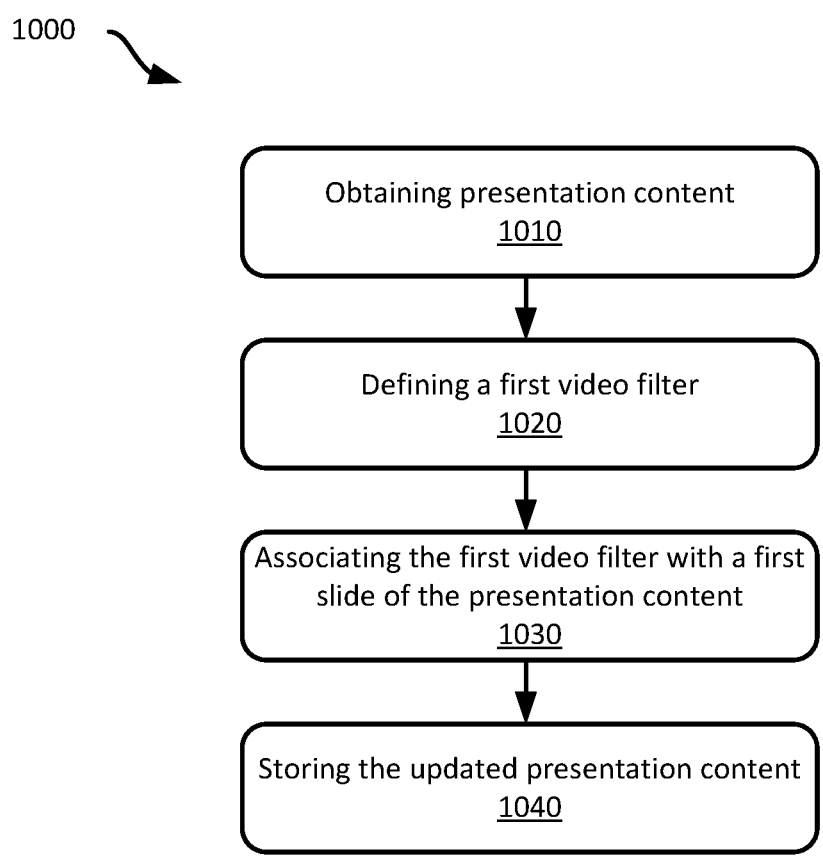

Referring now to FIG. 10, FIG. 10 shows an example method 1000 for generating composite presentation content in video conferences. The example method 1000 will be described with respect to FIGS. 3-5; however, any suitable systems according to this disclosure may be employed according to various examples.

At block 1010, the presenter's client device 330 obtains presentation content. In this example, the presentation content includes one or more presentation slides, however, any suitable type of presentation content may be employed, including documents, audio, video, etc. Further, in some examples, the presenter may use their client device 330 to create new presentation content, such as by creating a new presentation and creating one or more slides for the presentation.

At block 1020, the presenter defines a first video filter. As discussed above with respect to FIGS. 5-8B, a video filter defines the display arrangement for the presentation content and for one or more other video feeds. For example, the presenter may employ the application used to generate or present the presentation slides to define one or more video filters, e.g., by creating a new video filter. The user may select an option to create a video filter and include one or more sub-regions within the video filter. The user may move or size the sub-regions to create the desired arrangement of content items and video feeds. Alternatively, in some example, the presenter may obtain existing video filters from their client device 330 or from another client device, e.g., from a server at the video conference provider 310 and may use such video filters without revisions or may edit them to achieve a desired appearance.

At block 1030, the presenter associates the video filter with a presentation slide. For example, the presenter selects one or more slides and a corresponding video filter.

At block 1040, the presenter stores the updated presentation content. In this example, the presenter stores the presentation content that includes the presentation slides (or other content item) and the video filters, as well as the associations between them. For example, the presentation content may be stored in a single file, such as a native file format for an editing application for the presentation content or in a custom file format defined by the video conference software. However, in some examples, the video filters may be stored separately from the presentation slides, e.g., in another file, whether locally or remotely, while the associations are stored with the presentation slides.

Figure 11:
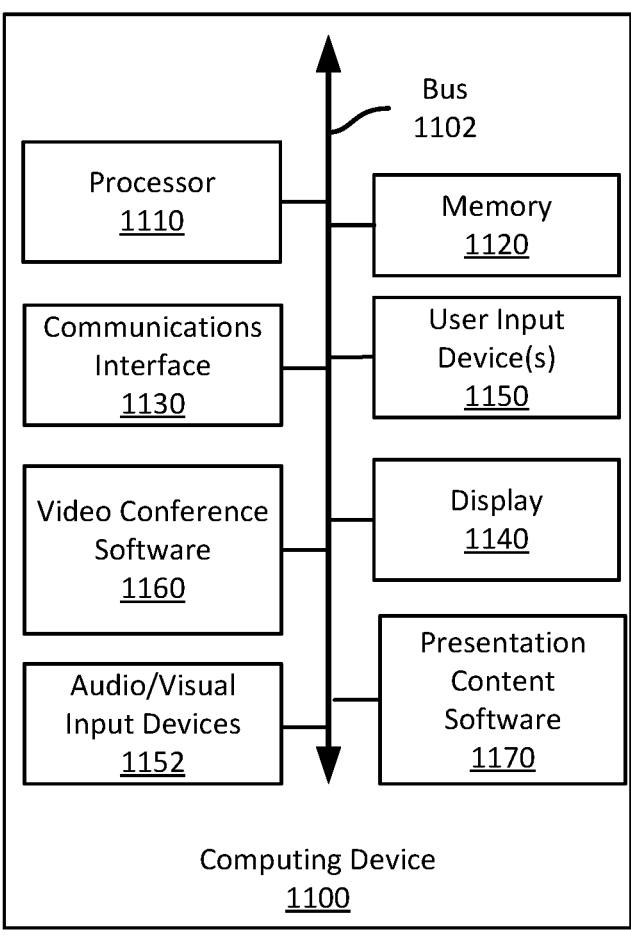
FIG. 11 shows an example computing device suitable for use with systems and methods for generating composite presentation content in video conferences.

Referring now to FIG. 11, FIG. 11 shows an example computing device 1100 suitable for use in example systems or methods for generating composite presentation content in video conferences according to this disclosure. The example computing device 1100 includes a processor 1110 which is in communication with the memory 1120 and other components of the computing device 1100 using one or more communications buses 1102. The processor 1110 is configured to execute processor-executable instructions stored in the memory 1120 to perform one or more methods for generating composite presentation content in video conferences according to different examples, such as part or all of the example methods 900-1000 described above with respect to FIGS. 9-10. The computing device, in this example, also includes one or more user input devices 1150, such as a keyboard, mouse, touchscreen, microphone, etc., to accept user input. The computing device may also include one or more audio or visual input devices, such as a camera and a microphone, or one or more ports to receive audio or video feeds from an external device, such as a camera, video player, etc. The computing device 1100 also includes a display 1140 to provide visual output to a user.

In addition, the computing device 1100 also includes both video conference software 1160 and presentation content software 1170. A user of the computing device 1100 may use the video conference software 1160 to join and participate in a video conference, generally as discussed above. In addition, the video conference software 1160 may enable a presenter to perform the methods discussed above. The computing device 1100 also includes presentation content software 1170, which may allow the user to access and present presentation content, or create or modify presentation content, including one or more video filters, and associate one or more video filters with content items in the presentation content, generally as described above.

The computing device 1100 also includes a communications interface 1140. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, at a client device during a video conference hosted by a video conference provider, a selection of presentation content, the presentation content comprising a content item and an association between the content item and a video filter;
generating a content video feed based on the presentation content and a video feed from a camera in communication with the client device, the content video feed including a portion of the video feed positioned relative to the content item based on the associated video filter; and
providing the content video feed to one or more participants in the video conference.

2. The method of claim 1, wherein the presentation content comprises a presentation slide or an electronic document.

3. The method of claim 1, wherein the presentation content further comprises an association between the content item and a second video filter, and further comprising:
accessing the second video filter;
generating an updated content video feed comprising the content item and the video feed, the video feed positioned relative to the content item based on the second video filter; and
providing, via the video conference provider, the updated content video feed to one or more video conference participants via the video conference.

4. The method of claim 3, wherein the video filter corresponds to a first portion of the content item and the second video filter corresponds to a second portion of the content item, and wherein accessing the second video filter is in response to receiving an input to present the second portion of the content item.

5. The method of claim 1, further comprising:
receiving a selection of a second presentation content, wherein the second presentation content comprises a second content item, the video filter establishing an arrangement of the content item, the second content item, and the video feed; and
generating an updated content video feed based on the content item, the second content item, and the video feed.

6. The method of claim 5, wherein the content item associated with a first application and the second content item associated with a second application, the second application different than the first application.

7. The method of claim 6, wherein the first application is a presentation slide application and the second application is a video player application.

8. A system comprising:
a non-transitory computer-readable medium; and
one or more processors configured to execute processor-executable instructions stored in the non-transitory computer-readable medium configured to cause the one or more processors to:
receive, by a client device during a video conference hosted by a video conference provider, a selection of presentation content, the presentation content comprising a content item and an association between the content item and a video filter;
generate a content video feed based on the presentation content and a video feed from a camera in communication with the client device, the content video feed including a portion of the video feed positioned relative to the content item based on the associated video filter; and
provide the content video feed to one or more participants in the video conference.

9. The system of claim 8, wherein the presentation content comprises a presentation slide or an electronic document.

10. The system of claim 8, wherein the presentation content further comprises an association between the content item and a second video filter, and wherein the one or more processors are configured to execute further processor-executable instructions stored in the non-transitory computer-readable medium to cause the one or more processors to:
access the second video filter;
generate an updated content video feed comprising the content item and the video feed, the video feed positioned relative to the content item based on the second video filter; and provide, via the video conference provider, the updated content video feed to one or more video conference participants via the video conference.

11. The system of claim 10, wherein the video filter corresponds to a first portion of the content item and the second video filter corresponds to a second portion of the content item, and wherein accessing the second video filter is in response to receiving an input to present the second portion of the content item.

12. The system of claim 8, wherein the one or more processors are configured to execute further processor-executable instructions stored in the non-transitory computer-readable medium to cause the one or more processors to:

receiving a selection of a second presentation content, wherein the second presentation content comprises a second content item, the video filter establishing an arrangement of the content item, the second content item, and the video feed; and generating an updated content video feed based on the content item, the second content item, and the video feed.

13. The system of claim 12, wherein the content item associated with a first application and the second content item associated with a second application, the second application different than the first application.

14. The system of claim 13, wherein the first application is a presentation slide application and the second application is a video player application.

15. A non-transitory computer-readable medium comprising processor-executable instructions configured to cause one or more processors to:

receive, at a client device during a video conference hosted by a video conference provider, a selection of presentation content, the presentation content comprising a content item and an association between the content item and a video filter;

generate a content video feed based on the presentation content and a video feed from a camera in communication with the client device, the content video feed including a portion of the video feed positioned relative to the content item based on the associated video filter; and provide the content video feed to one or more participants in the video conference.

16. The non-transitory computer-readable medium of claim 15, wherein the presentation content comprises a presentation slide or an electronic document.

17. The non-transitory computer-readable medium of claim 15, wherein the presentation content further comprises an association between the content item and a second video filter, and further comprising processor-executable instructions configured to cause the one or more processors to:

access the second video filter;

generate an updated content video feed comprising the content item and the video feed, the video feed positioned relative to the content item based on the second video filter; and provide, via the video conference provider, the updated content video feed to one or more video conference participants via the video conference.

18. The non-transitory computer-readable medium of claim 17, wherein the video filter corresponds to a first portion of the content item and the second video filter corresponds to a second portion of the content item, and wherein accessing the second video filter is in response to receiving an input to present the second portion of the content item.

19. The non-transitory computer-readable medium of claim 15, further comprising processor-executable instructions configured to cause the one or more processors to:

receiving a selection of a second presentation content, wherein the second presentation content comprises a second content item, the video filter establishing an arrangement of the content item, the second content item, and the video feed; and generating an updated content video feed based on the content item, the second content item, and the video feed.

20. The non-transitory computer-readable medium of claim 19, wherein the content item associated with a first application and the second content item associated with a second application, the second application different than the first application.

* * * * *